United States Patent [19]

Margison

[11] 4,353,674
[45] Oct. 12, 1982

[54] DRAG BUCKET APPARATUS FOR SEPARATING PIECES OF SOLID MATERIAL FROM A LIQUID IN A RECEIVING TANK

[75] Inventor: Elwood R. Margison, Downers Grove, Ill.

[73] Assignee: United Conveyor Corporation, Deerfield, Ill.

[21] Appl. No.: 155,155

[22] Filed: May 30, 1980

[51] Int. Cl.³ .......................................... B65G 25/08
[52] U.S. Cl. ................................................ 414/323
[58] Field of Search ............... 414/323, 304, 697, 699, 414/143; 198/301, 507, 718

[56] References Cited

U.S. PATENT DOCUMENTS

| | | | |
|---|---|---|---|
| 984,249 | 2/1911 | Weschler | 30/198 |
| 2,305,929 | 12/1942 | Lund et al. | 210/143 |
| 3,410,412 | 11/1968 | Fechter | 210/143 |
| 3,476,272 | 11/1969 | Puta | 414/323 |
| 3,498,465 | 3/1970 | Klump et al. | 210/525 |
| 3,504,645 | 4/1970 | Davenport | 110/256 |
| 3,556,317 | 1/1971 | Vidal | 414/133 |
| 3,999,744 | 12/1976 | Kotch | 266/48 |
| 4,112,856 | 9/1978 | Fuhrman et al. | 210/165 R |
| 4,151,082 | 4/1979 | Stratmann et al. | 210/803 |
| 4,161,255 | 7/1979 | Ropert | 414/323 |
| 4,288,196 | 9/1981 | Sutton | 414/699 |

Primary Examiner—Richard A. Bertsch
Attorney, Agent, or Firm—Wegner, McCord, Wood & Dalton

[57] ABSTRACT

A drag bucket apparatus for separating pieces of solid material from liquid in a rectangular receiving tank includes driven trolleys that move along the longitudinal tank walls to pull a drag bucket along the tank from a start end to a dump end. If the drag bucket encounters excessive resistance during a pickup run, a pickup level control automatically raises the bucket incrementally to eliminate such excessive resistance; and when the trolleys near the dump end of the tank the bucket is automatically elevated to a discharge level and when the bucket is at the dump end its load of material is automatically dumped onto a material support out of the liquid. The drag bucket is then lowered and returned to the start end for another pickup run which may begin at once, or which may be delayed depending upon the conditions encountered during the last preceding pickup run. The apparatus is particularly adapted for use with a quenching tank that sits beneath a furnace and has a water seal within and generally parallel to the tank walls.

27 Claims, 20 Drawing Figures

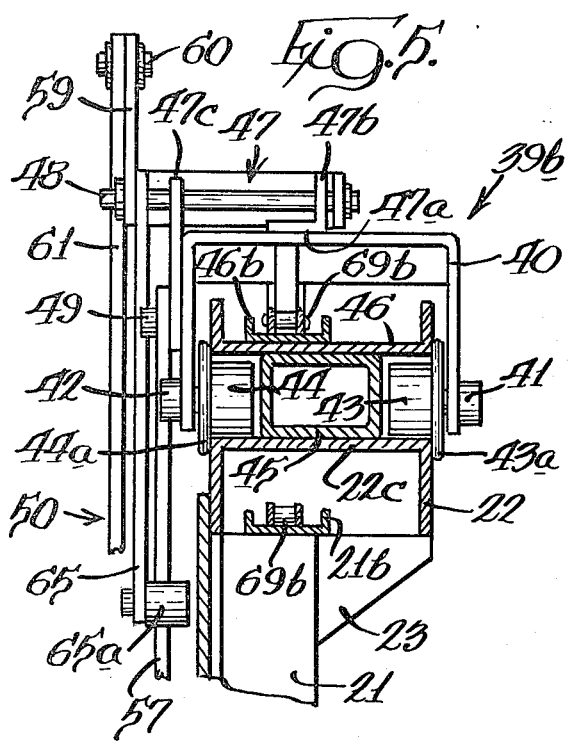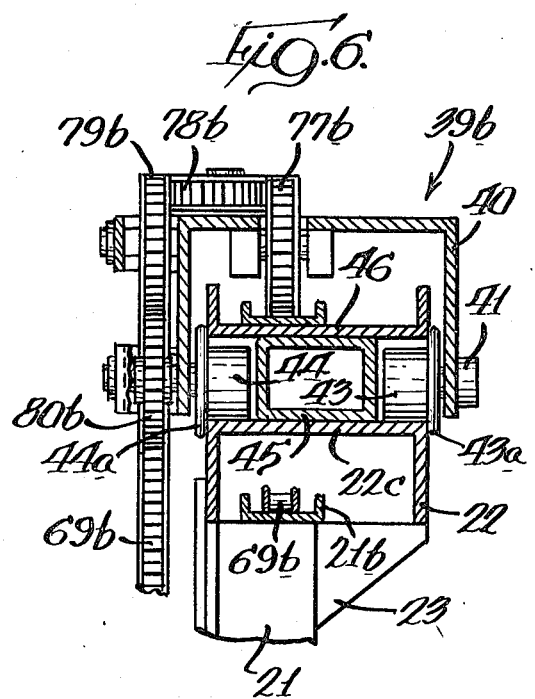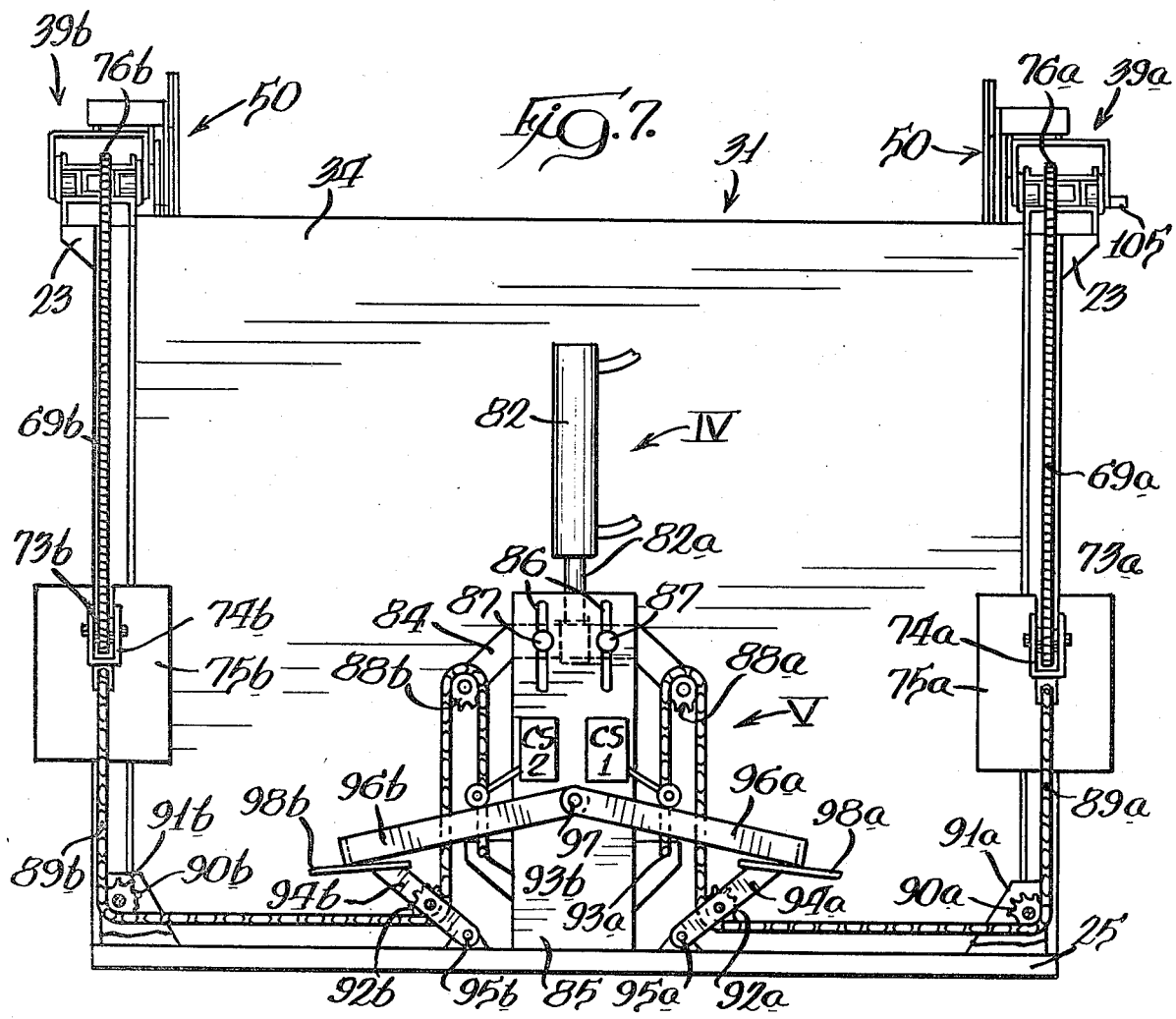

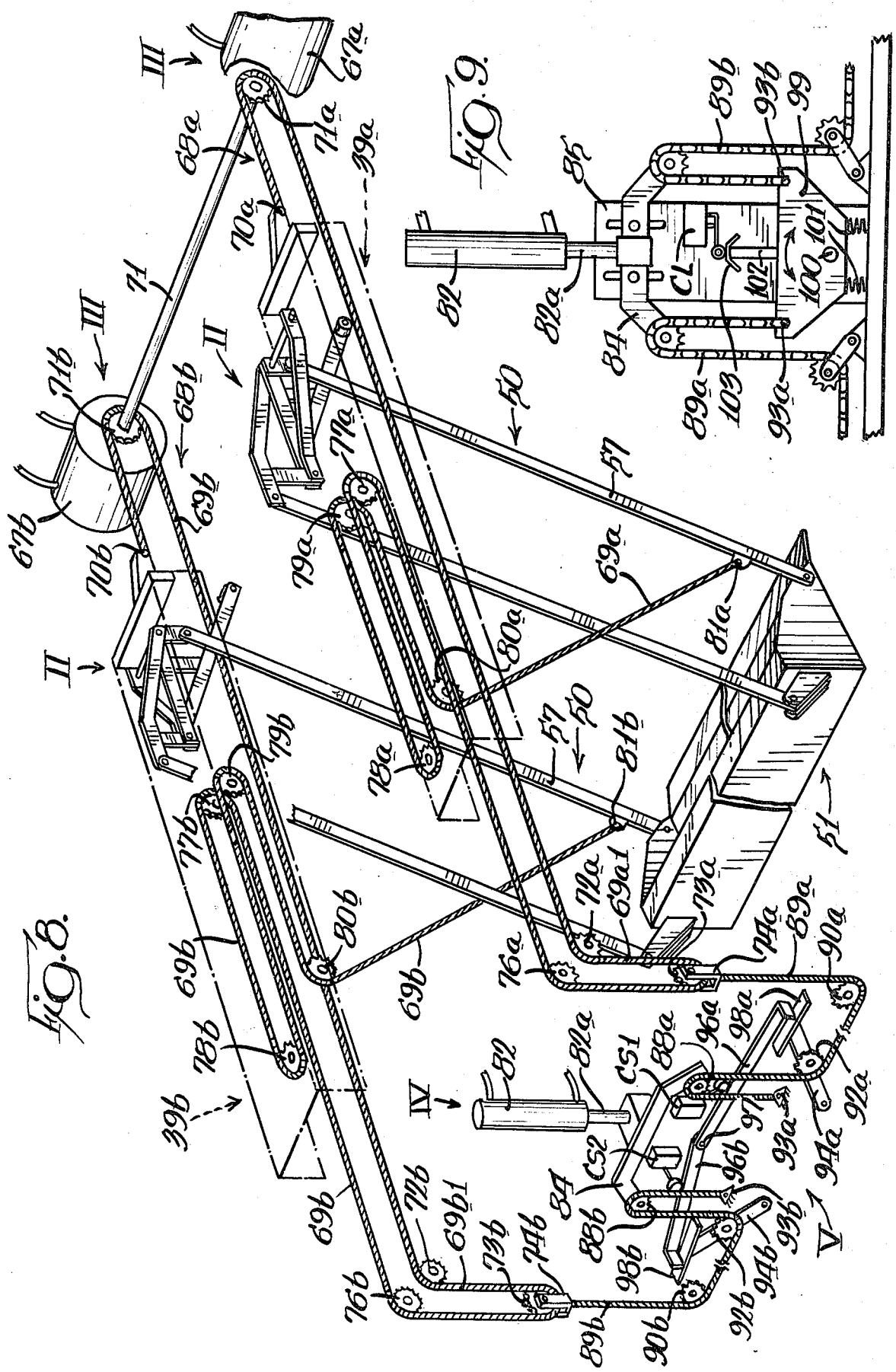

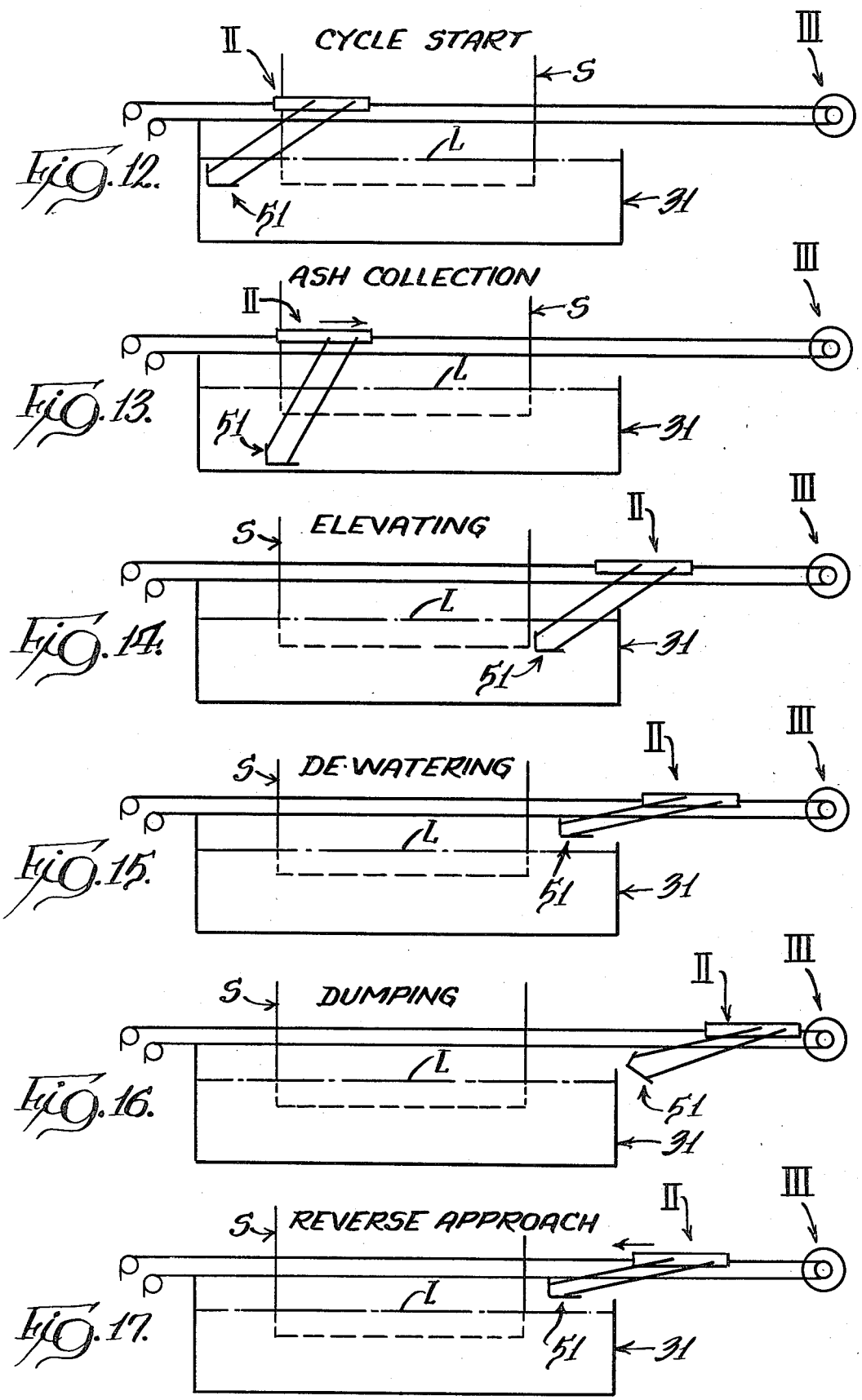

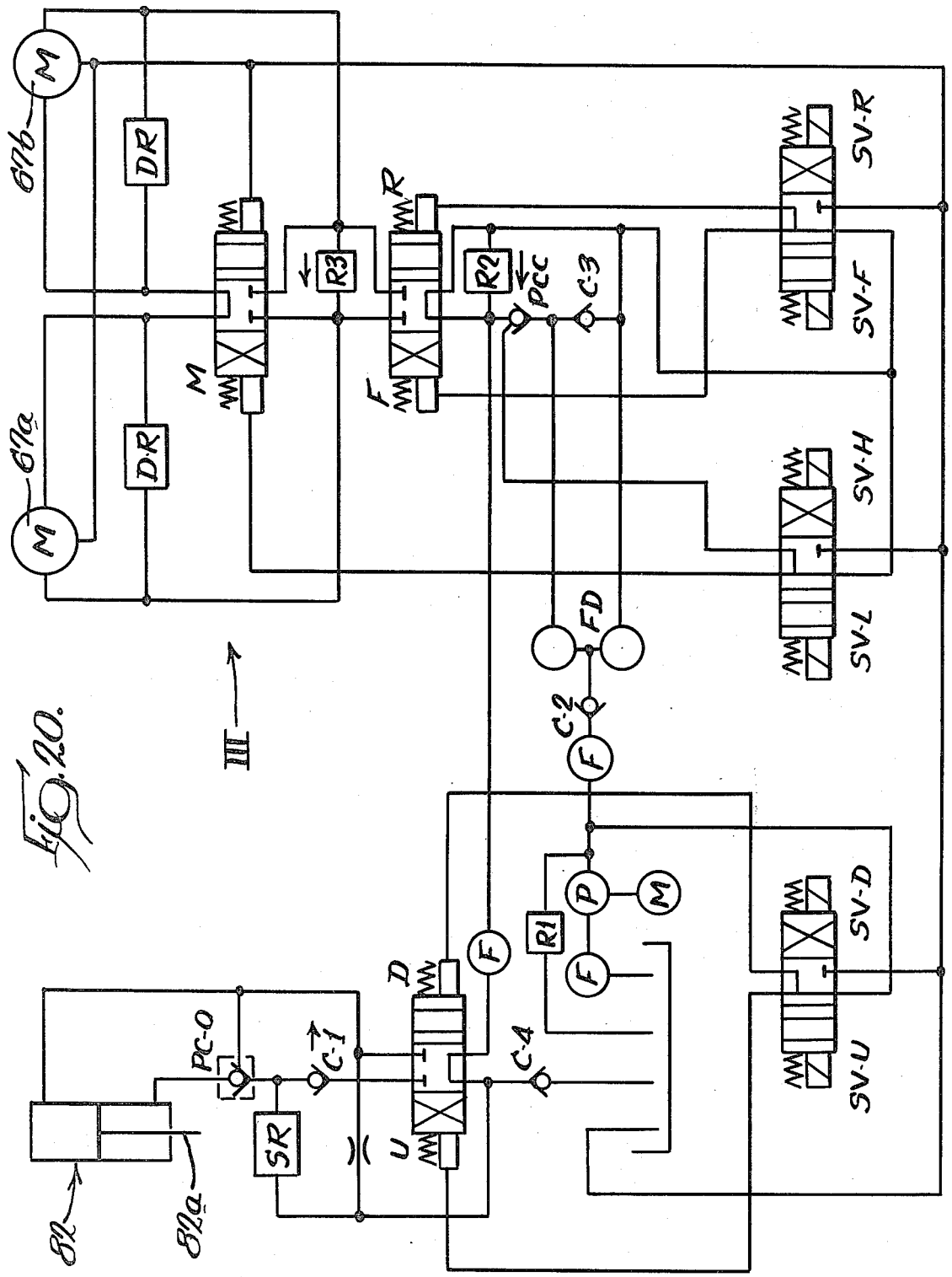

DRAG BUCKET APPARATUS FOR SEPARATING PIECES OF SOLID MATERIAL FROM A LIQUID IN A RECEIVING TANK

BACKGROUND OF THE INVENTION

There are many industrial operations which produce large quantities of material that must be collected in a tank and then removed from the tank for further processing or disposition. Such material may vary in size from rather small particles of a sand-like character up to material the size of crushed stone with occasional pieces weighing several hundred pounds. Often such tanks constitute water filled quenching tanks to receive the bottom ash that is produced in huge quantities in various types of solid material burning furnaces. Such tanks are commonly of an elongated rectangular shape, and in the case of a quenching tank the bottom of the furnace commonly has a water seal which is spaced inwardly from the tank walls and extends below the waterline.

In other cases the tank may be a dewatering tank into which material laden water is loaded for dewatering.

There has, for many years, been a need for a rugged and dependable drag bucket type of apparatus which can be used to remove material from such a tank, either periodically as required or continuously in repetitive cycles. Typical of equipment with which such apparatus may be used are the high capacity coal burning furnaces used in large electric power generating plants. Such a furnace may require a quenching tank in excess of 60 feet long and capable of handling an ash output of several tons an hour. The material delivered through the furnace grates varies in size from that of coarse gravel to several hundred pound chunks. For such an application the drag bucket apparatus must be capable of cycling for extended periods of time without the intervention of any human attendant, and must be adaptable to the varying conditions created by such a wide range of material sizes.

Another typical application for such apparatus is to receive the output of a bank burner which is used to consume and dispose of the enormous quantities of unusable bark produced in a lumbering operation. A bark burner may require a quenching tank no more than about 15 feet in length.

SUMMARY OF THE INVENTION

The present invention consists of drag bucket apparatus for removing pieces of solid material from the bottom of an elongated, rectangular, receiving tank which contains liquid and said solid material. The apparatus includes trolley means adapted to move along the longitudinal upper margins of the tank between a start end and a dump end, drive means for moving the trolley means between the ends of the tank in a pickup run and a return run, a drag bucket in the tank, and supporting means suspending the drag bucket from the trolley means for movement between an initial pickup level near the bottom of the tank and a fully elevated discharge level. Operation of the apparatus also requires drag bucket elevating means for moving the bucket between the initial pickup level and the discharge level, and drag bucket pickup level control means operatively associated with the supporting means and with the elevating means, the level control means including means for detecting when resistance to movement of the drag bucket through the material reaches a predetermined high point during a pickup run, and means operable when resistance reaches that predetermined high point to operate the elevating means only until the resistance drops below the high point, so that the drag bucket is elevated incrementally during a pickup run to keep the resistance below the high point. Further, the apparatus requires control means for the trolley driving means and the elevating means to provide an operating cycle in which the drag bucket moves through a pickup run starting at the initial pickup level and ending at the discharge level, and a return run, with the pickup level control means operative throughout the pickup run. Also required is load release means for releasing the contents of the fully elevated drag bucket at the dump end.

In some industrial operations the apparatus of the invention may be cycled by manually operated switches; while in other situations it must be completely automatic so as to go through an indeterminate number of successive cycles with attention only if it malfunctions in some way.

The term "pieces of solid material" is used herein as the generic term to include anything within the wide variety of material sizes which may need to be removed from the bottom of a filled receiving tank in which there is a liquid.

THE DRAWINGS

FIG. 5 is a fragmentary sectional view on an enlarged scale taken substantially as indicated along the line 5—5 of FIG. 3;

FIG. 6 is a fragmentary sectional view on an enlarged scale taken substantially as indicated along the line 6—6 of FIG. 3 with parts of the drag bucket suspension mechanism omitted for clarity of illustration of the bucket drive and elevating chains;

FIG. 7 is a fragmentary end elevational view taken substantially as indicated along the line 7—7 of FIG. 1;

FIG. 8 is a schematic perspective view of the trolleys, the drag bucket suspension, the drive means, the bucket elevating means, and the bucket pickup level control means;

FIG. 9 is a fragmentary sectional view taken substantially as indicated along the line 9—9 of FIG. 1;

FIGS. 12 to 17 are diagrammatic views showing the positions of the trolleys, linkages and drag bucket relative to the tank and the water seal at the stages of an operating cycle indicated therein;

FIG. 20 is a circuit diagram of the hydraulic controls for the apparatus.

DETAILED DESCRIPTION OF THE INVENTION

The apparatus of the invention consists generally of a frame and receiving tank, indicated generally at I; trolley, drag bucket, and drag bucket suspension means, indicated generally at II; drive means, indicated generally at III (FIG. 8); drag bucket elevating means, indicated generally at IV (FIGS. 7 and 8); drag bucket pickup level control means, indicated generally at V (FIGS. 7 and 8); an automatic electrical control circuit, indicated generally at VI (FIGS. 10, 11, 18 and 19); and a hydraulic control system, indicated generally at VII (FIG. 20).

Figure 1:
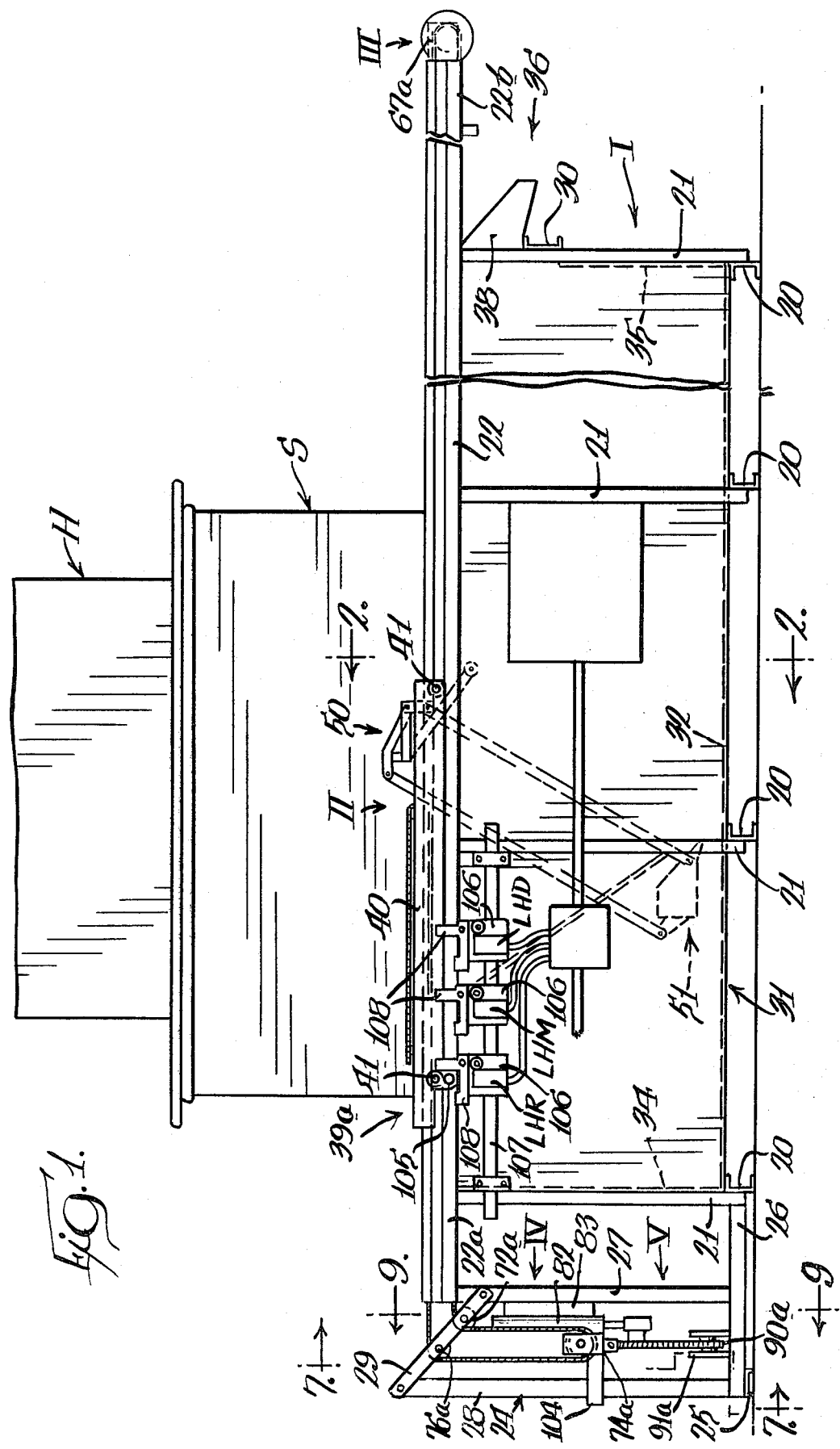
FIG. 1 is a fragmentary side elevational view of the apparatus of the invention in position beneath a piece of equipment such as a furnace which produces bottom ash that is received in the liquid filled tank of the apparatus of the invention.
Figure 2:
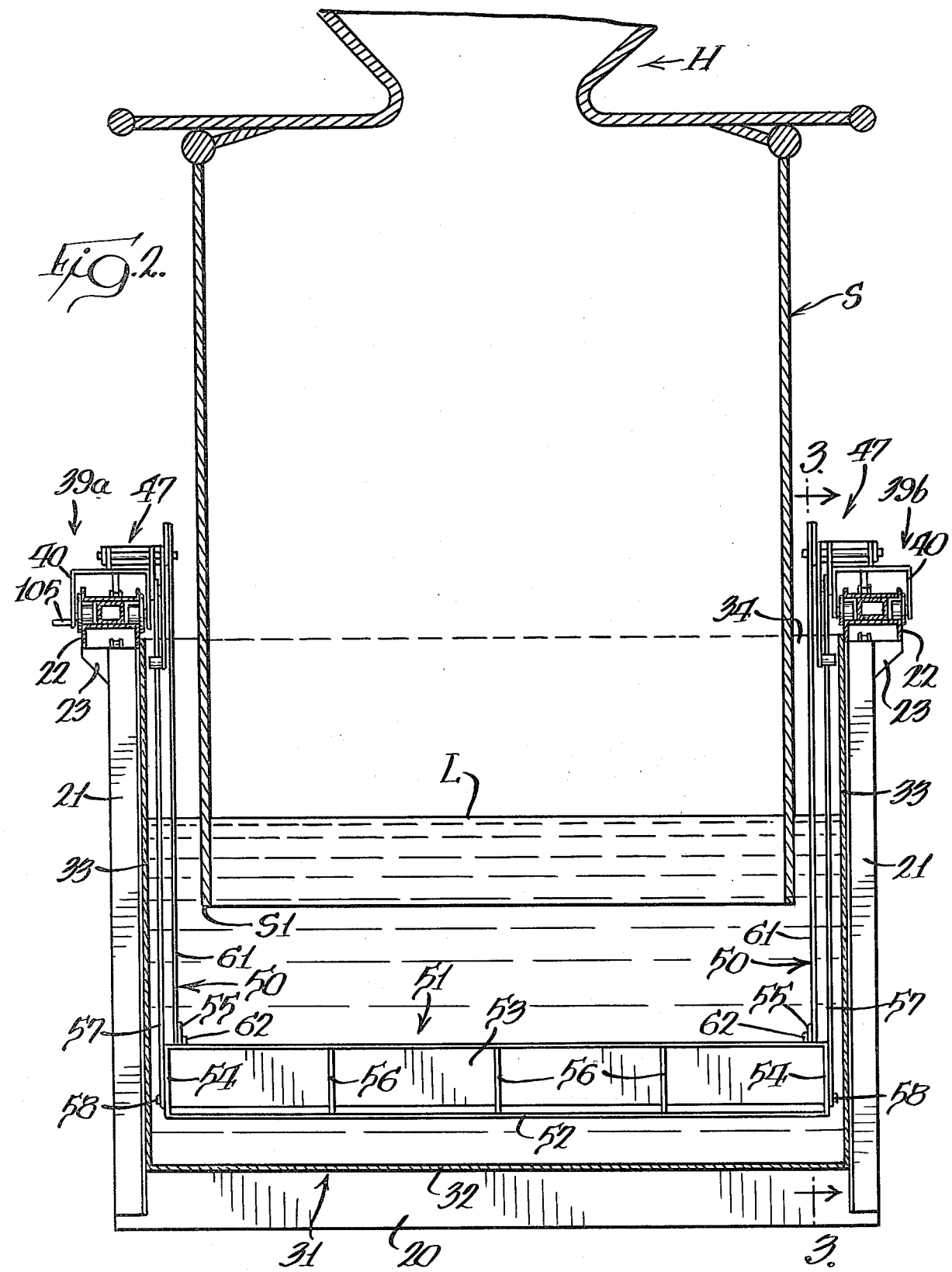
FIG. 2 is a transverse sectional view on an enlarged scale taken substantially as indicated along the line 2—2 of FIG. 1.

Referring to the drawings in detail, and referring first to FIGS. 1 and 2, the frame and receiving tank I consists of a plurality of transverse base channel members 20, upright angle members 21 welded at their lower end portions to the channels 20 and which provide side frame members for the tank, and inverted longitudinal top channels 22 which surmount the upright angles 21 and are secured thereto with reinforcing gussets 23. Additionally, the frame includes a supporting framework, indicated generally at 24, for the principal parts of the drag bucket elevating means IV and the drag bucket pickup level control means V. The framework 24 includes an inverted bottom channel 25, longitudinal bottom angles 26 at the two sides of the framework which are welded to the inverted bottom channel 25 and to the nearest of the upright angle members 21, upright angle members 27 and 28 which are welded at their lower ends to the longitudinal angles 26 and which are connected at their upper ends by inclined frame members 29, and end portions 22a of the inverted top channels 22 which are also connected to the upper ends of the upright angle members 27. In addition to end portions 22a of the inverted channels 22, end portions 22b of said inverted channels extend a substantial distance beyond the opposite upright end frame angles 21 to provide support for part of the drive means III. Additionally, a transverse upper channel member 30 extends across the end of the frame opposite the framework 24.

The receiving tank, indicated generally at 31, consists of a bottom wall 32, parallel longitudinal side walls 33, a start end wall 34 which is adjacent the framework 24, and a dump end wall 35 the upper end portion of which is welded along the transverse upper channel member 30. Also forming a part of the frame and tank I is a material support, indicated generally at 36, which includes a downwardly and outwardly inclined bottom wall 37 supported upon the upper channel member 30, and parallel side panels 38.

Illustrated above the tank 31 in FIGS. 1 and 2 is a material feed hopper, indicated generally at H, and depending from the underside of the hopper H is a rectangular liquid seal, indicated generally at S, the lower end portion Sl of which is below the surface level L of liquid in the receiving tank 31.

Referring now particularly to FIGS. 2 to 6, the trolley, drag bucket and drag bucket support II consist of two independent trolley assemblies, indicated generally at 39a and 39b. Each of the trolley assemblies is best seen in FIGS. 5 and 6 to consist of an elongated inverted channel frame member 40 at the opposite end portions of which are outer and inner spindles 41 and 42, respectively, on which are journalled trolley rollers 43 and 44 which roll upon top webs 22c of the inverted upper frame channels 22 on opposite sides of longitudinal, median box beams 45 which are welded to the top webs 22c and support upper guide channels 46. The respective rollers 43 and 44 have guide flanges 43a and 44a which roll along upright outer webs of the channels 22 and 46 to guide the trolleys 39a and 39b along the side walls 39 of the tank 31.

Figure 3:
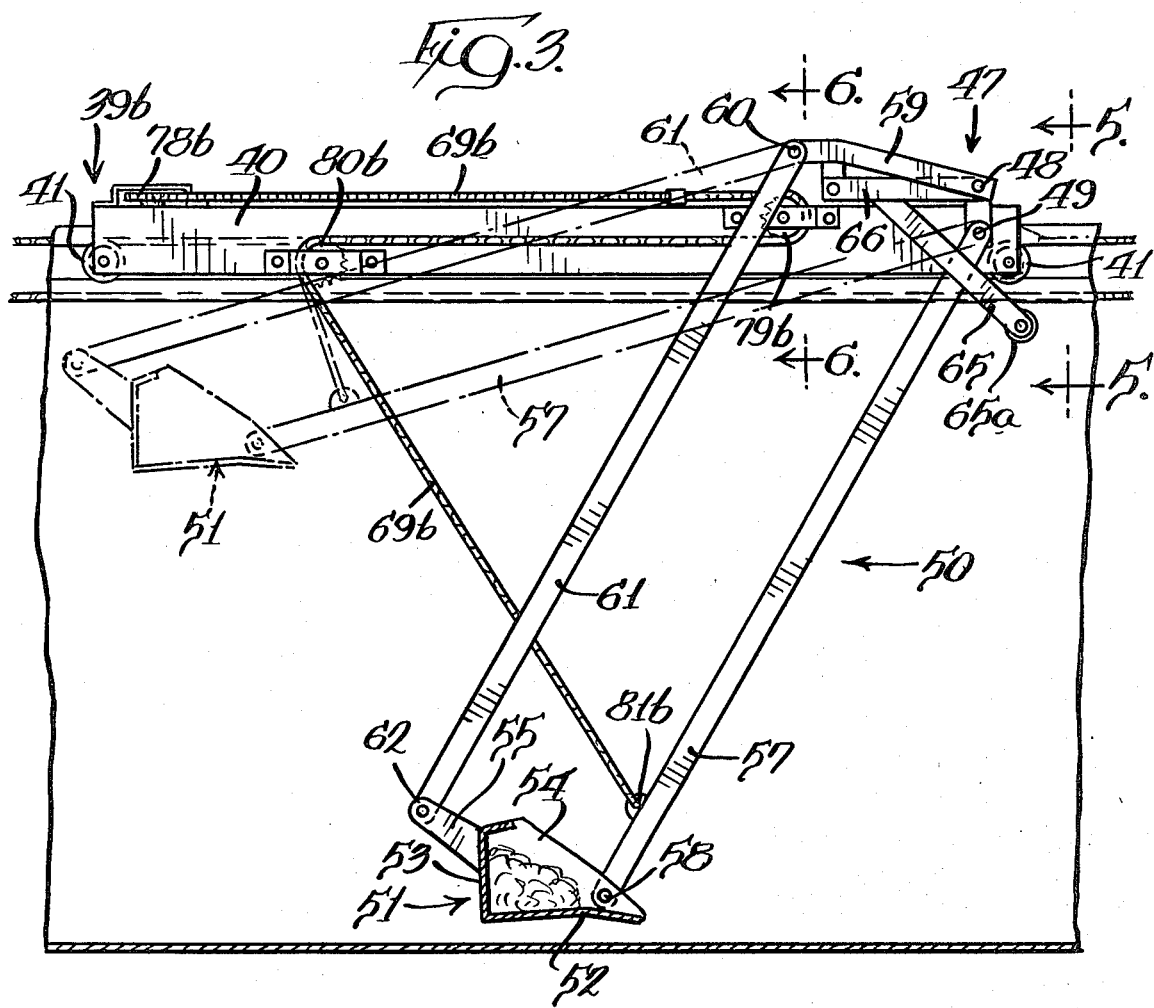
FIG. 3 is a fragmentary longitudinal sectional view taken substantially as indicated along the line 3—3 of FIG. 2 showing the drag bucket and its supporting means in full lines at the initial pickup level and in broken lines at the discharge level.
Figure 4:
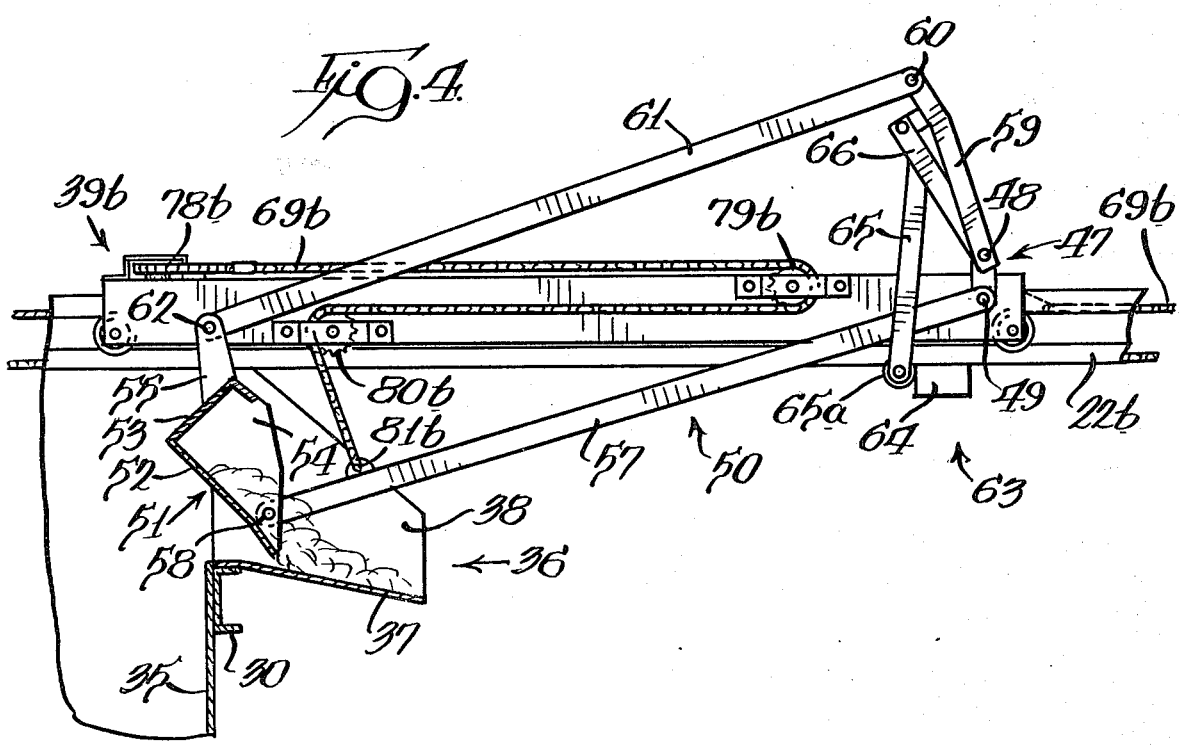
FIG. 4 is a view similar to FIG. 3 illustrating the drag bucket and its supporting linkage in the position that they occupy when material is being dumped from the bucket.
Figure 10:
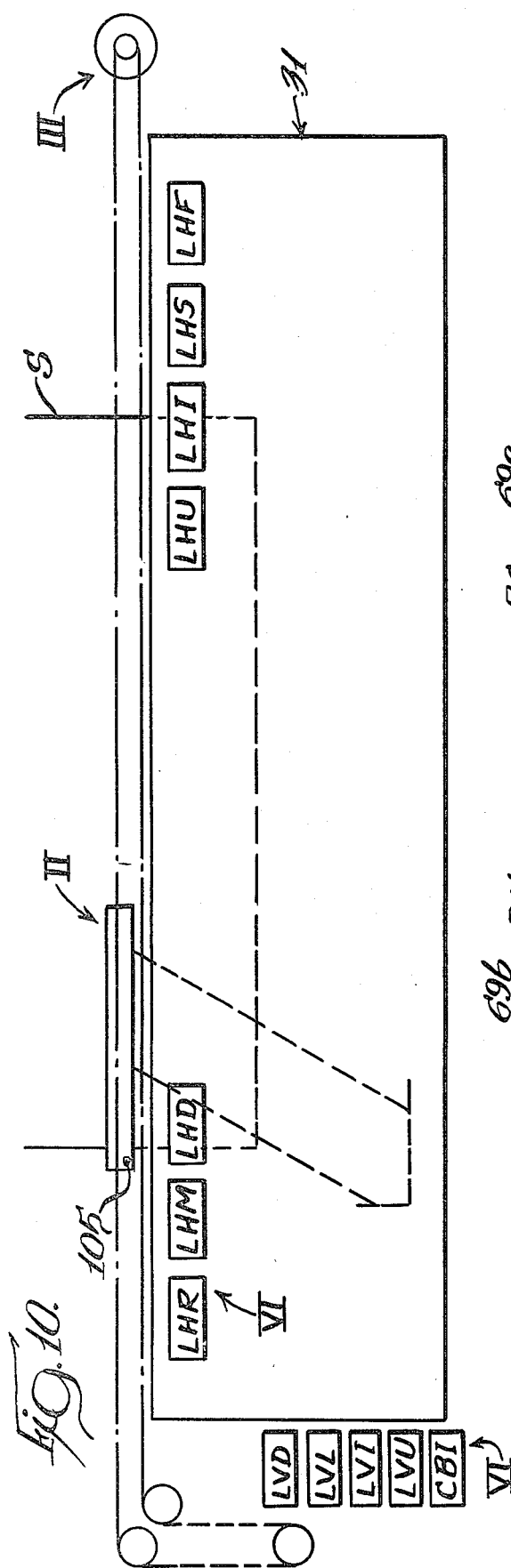
FIG. 10 is a schematic side elevational view illustrating the locations of the limit switches which control the cycling of the apparatus.
Figure 11:
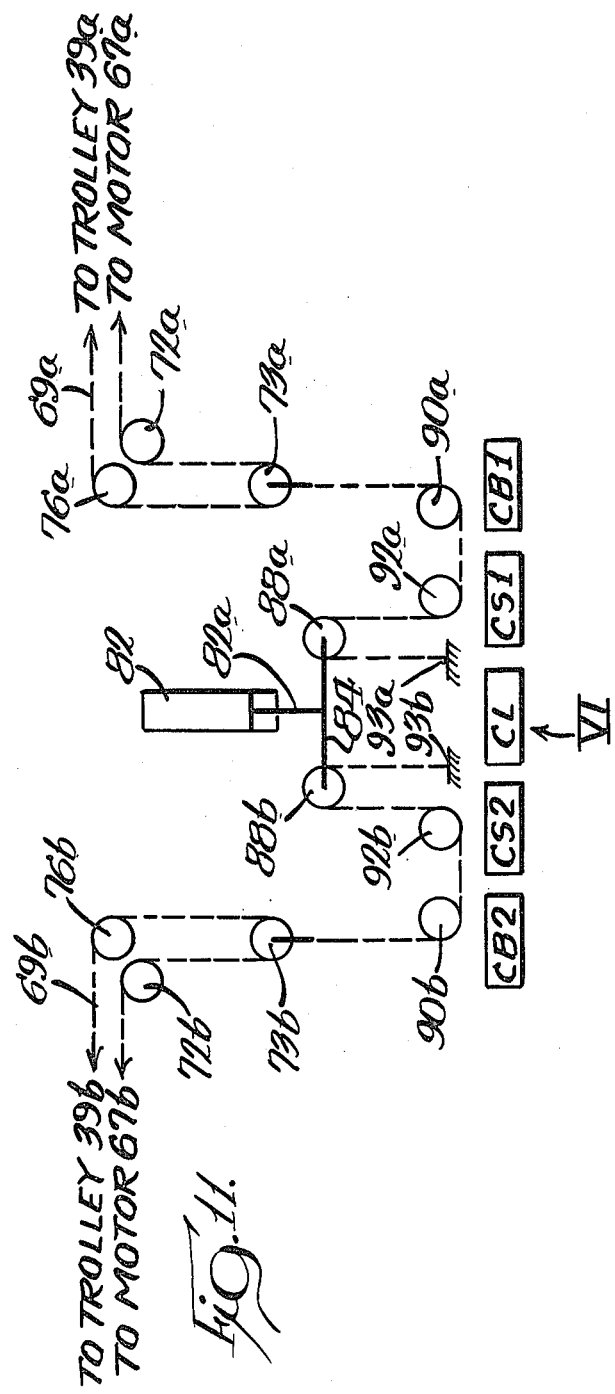
FIG. 11 is a schematic end elevational view illustrating the relative positions of limit switches which are part of the pickup level control means V.

As best seen in FIGS. 3 to 5, surmounting each of the trolley channels 40 is a linkage pivot bracket, indicated generally at 47, which includes a base web 47a welded to the top of the trolley channel 40, and laterally spaced upright journal webs 47b and 47c which carry an upper linkage pivot 48; and the web 47c extends downwardly along an inner web of the trolley channel 40 and carries a lower linkage pivot 49.

Carried upon the linkage pivots 48 and 49 of the two trolleys are parallel linkages, indicated generally at 50, which support a drag bucket, indicated generally at 51, from the trolleys 39a and 39b. The drag bucket 51 consists of a bottom wall 52, a rear wall 53, end walls 54, and a pair of rear link arms 55 which extend rearwardly and upwardly from the rear wall 53 of the bucket. Additionally, as seen in FIG. 2, the bucket is divided into a plurality of compartments by intermediate webs 56.

Referring now particularly to FIGS. 3 and 4, each parallel linkage 50 is seen to consist of a forward link 57 which is mounted upon the lower linkage pivot 49 and is pivotally connected at 58 to an end wall 54 of the drag bucket 51. An upper link 59 is connected to the upper pivot 48, and has a pivot 60 upon which is mounted a rear link 61 the lower end of which is pivotally connected at 62 to a back arm 55 of the drag bucket. Thus, as a comparison of the full line and broken line showings of FIG. 3 will show, the linkage 50 is of a type which maintains the angular disposition of the drag bucket at any level at which it is required to function.

As seen in FIG. 4, a load release means, indicated generally at 63, comprises fixed trip bars 64 on the undersides of the end portions 22b of the inverted upper frame channels 22 a substantial distance beyond the dump end wall 35 of the tank, and trip arms 65 which are fixedly mounted on a rigid bracket 66 on the upper links 59 of the parallel linkages 50. The trip arms 65 are provided with trip rollers 65a which strike the trip bars 64 to open the space between the front and rear links 57 and 61, as seen by comparing the broken line showing of FIG. 3 with the showing of FIG. 4, so as to tilt the drag bucket 51 forwardly and release the entire contents of the bucket onto the material support 36 from which it slides into a mobile unit or onto a conveyor which removes it from the vicinity of the tank.

Referring now particularly to FIGS. 3, 5, 6 and 8, the drive means 3 includes a pair of hydraulic motors 67a and 67b which are seen in FIG 1 to be mounted at the extremities of the inverted top frame channel end portions 22b; and chain and sprocket systems, indicated generally at 68a and 68b, by means of which the trolley members 35a and 39b are, respectively, caused to reciprocate along the top channels 22 between the start end and the dump end of the tank.

Referring particularly to FIG. 8, the two chain and sprocket systems 68a and 68b are seen to be identical mirror images of one another. Only 68b will be described in detail, because that is the one which also appears in FIGS. 3, 5 and 6.

A roller chain 69b has an end secured to a drawbar 70b which is at the front of the trolley assembly 39b. From the drawbar 70b the chain 69b extends around a sprocket 71b which is on a shaft 70 that connects the motors 67a and 67b, and the roller chain 69b is seen in FIGS. 5 and 6 to ride in an upwardly open supporting channel 21b which is supported on the upright frame angle member 21 and the gussets 23. The chain 69b passes over a sprocket 72b which is seen in FIG. 1 to be journalled on the inclined member 29 of the framework 24. A counterweight sprocket 73b is journalled in a yoke 74b on a counterweight 75b (see FIG. 7); and the counterweight sprocket 73b is suspended in a bight 69b1 of the chain 69b which is formed by a downward run of the chain from the sprocket 72b and an upward run of the chain to a sprocket 76b which is seen in FIG. 1 to be supported on the framework member 29 diagonally above and outwardly from the sprocket 72a. From the sprocket 76b the chain 69b runs in a channel 46b that is mounted in the upwardly open channel 46 of the frame, and from there it extends around a sprocket 77b which is on a transverse axis, a sprocket 78b which is on a vertical axis, a sprocket 79b which is on a transverse axis, a sprocket 80b, and is anchored at 81b to one of the forward links 57 of the parallel linkage 50.

The sprockets 77b, 78b, 79b and 80b are seen in FIG. 6 to be mounted upon the trolley member 39b, so the chain runs between those sprockets travel with the trolley, while the chain runs between the drive sprockets 71b and the sprockets 72b and 76b are fixed relative to the frame and tank I. The suspended counterweight sprocket 73b is free to move vertically as the parallel linkages 50 swing upwardly upon the trolleys. It is seen, therefore, that the chain 69b is a part of the drive means III and is also a part of the drag bucket elevating means IV.

The components of the chain and sprocket system 68a are identical to those of the system 68b, so they are not described; but they are identified by corresponding reference numerals, each with an a suffix, in FIGS. 1, 7 and 8.

As previously indicated, the chains 69a and 69b which form part of the drive mechanism III also form part of the drag bucket elevating means IV; and in addition, the drag bucket pickup level control means V and the elevating means IV cooperate in such a way that the level control means V is also effectively a part of the elevating means IV.

As best seen in FIGS. 1, 7 and 8, the elevating means IV includes a hydraulic cylinder unit 82 which is carried in a vertical position upon the framework 24 by bracket means 83. A piston rod 82a of the hydraulic cylinder unit carries a yoke 84; and a mounting plate 85 which is part of the framework 24 has vertical slots 86 which receive headed guide studs 87 on the yoke 84. Yoke sprockets 88a and 88b at the lateral extremities of the yoke 84 serve as parts of the drag bucket elevating means IV and also as parts of the pickup level control means V.

Connected to the yokes 74a and 74b on the counterweights 75a and 75b are slack sensor chains 89a and 89b which are identically arranged except for being of opposite hand, and which function identically. Accordingly, only the arrangement of the slack sensor chain 89b will be described in detail. The chain extends vertically from the yoke 74b and passes around a sprocket 90b which is journalled in a bracket 91b on the framework 24. The chain 89b extends beneath a movable sprocket 92b, around the yoke sprocket 88b, and downwardly to an anchor 93b the mounting of which will be described in more detail hereinafter. The movable sprocket 92b is journalled upon a slack sensor arm 94b which is pivoted at 95b on a bracket which is supported upon a part of the framework 24. An arm 96b is mounted upon a pivot 97 on the plate 85, and the outer end of the arm 96b rests upon a plate 98b on the slack sensor arm 94b.

As the drag bucket 51 is moved along the tank 31 by the drive means III in a pickup run, if the drag bucket encounters resistance to movement which is in excess of a predetermined maximum, then the linkage and drive bucket pivot upwardly about the pivots 48 and 49 from the initial drag bucket pickup level illustrated in FIG. 3. When this occurs, of course, depends upon the combined weight of the parallel linkages 50 and the drag bucket 51, and the angle of the linkages with respect to the horizontal. It also depends upon the load in the drag bucket.

Upward swinging movement of the linkages and the drag bucket results in reducing the load on the counterweights 75a and 75b so that those counterweights may move downwardly; and this in turn produces slack in the slack sensor chains 89a and 89b the result of which is to permit the slack sensor arms 94a and 94b to pivot downwardly and thus let the arms 96a and 96b also pivot downwardly. This, in turn, actuates limit switches CS1 and CS2 which are seen in FIG. 7 to be mounted upon the plate 85. The limit switches are part of the electrical control system VI, and operate through the hydraulic control system VII (both of which will be described in detail hereinafter) to admit hydraulic fluid to the cylinder of the unit 82 to retract the piston rod 82a and raise the yoke 84 far enough to take the slack out of the slack sensor chains 89a and 89b and thus cause the drag bucket to remain at whatever level had been attained by it when the slack sensor arms 94a and 94b dropped.

It is apparent from the foregoing description that the vertical position of the drag bucket 51 depends, ultimately, upon the position of the yoke 84 which is controlled by operation of the hydraulic cylinder unit 82. Nevertheless, movement of the yoke 84 is transmitted to the drag bucket 51 only through the slack sensor chains 89a and 89b. The height at which the drag bucket 51 is operating at any given time during a pickup run depends upon the operation of the pickup level control means V; but in addition, of course, the hydraulic cylinder unit 82 may also be actuated by means other than the limit switches CS1 and CS2 in order to position the bucket at the initial pickup level of FIG. 3, move it to the discharge position of FIG. 4, and again return it to the initial pickup level of FIG. 3.

The reason for the independent slack sensor chains 89a and 89b is that the load upon the drag bucket 51 is rarely evenly distributed on the two sides of its vertical median plane, so it is essential that the slack sensing means be capable of responding to indications of attainment of maximum load which may come first through only one of the two linkages 50.

The two interconnected drive means III are important because they keep the trolleys synchronized regardless of load variations.

If for any reason a chain 69a or 69b remains slack, providing a continuing "raise" signal to the hydraulic cylinder unit 82, the lifting pressure to the cylinder is reduced to prevent full lifting force from being applied only to the other chain. The mechanical means for accomplishing this is seen in FIG. 9. The anchors 93a and 93b for the tails of the slack sensor chains 89a and 89b are mounted upon a balance plate 99 which is pivoted at 100 upon the plate 85, and which is biased to a neutral position by a pair of adjustable compression springs 101. An upright balance arm 102 upon the balance plate 99 is surmounted by a cam plate 103 which retains the actuator of a chain load limit switch CL in a neutral position. If one chain remains slack, the balance plate tilts one way or the other against the bias of the springs 101 so as to actuate the limit switch C1 which acts through the electrical and hydraulic control systems VI and VII to reduce pressure to the cylinder 82.

The electrical control circuit VI includes sixteen limit switches, of which only CS1, CS2 and CL have heretofore been identified. The locations of the limit switches are illustrated diagrammatically in FIGS. 10 and 11, and the following table associates each switch with the element by which it is actuated, the condition of the apparatus when the switch is in normal position, and the function performed by the switch.

RELAYS AND THEIR FUNCTIONS

| CONTROL RELAYS | FUNCTIONS |
|---|---|
| RP | Power on |
| RO | Drive on |
| RR | Reverse |
| RD | Dwell |
| RC, RH, RM | Alarm Relays |
| TIME DELAY RELAYS | |
| TDU-1 | Raise Bucket |
| TDU-2 | Stop Trolley |
| TDU-3 | Stall Alarm |
| TDS-1 | Stall Alarm |
| TDS-2 | Stall Alarm |
| TD-D | Start Dwell |
| SOLENOID VALVES | |
| SV-F | Forward |
| SV-R | Reverse |
| SV-H | High Speed |
| SV-L | Low Speed |
| SV-U | Up |
| SV-D | Down |
| SR | Relief |

TDU-1 is field adjustable for a time delay of about 1½ to 3 seconds, to compensate for reaction time of the cylinder unit 82.

TD-D is also field adjustable to establish any delay in the start of a pickup run that is consistent with operating conditions.

One or another stall alarm operates if the apparatus takes too long to complete a particular part of a cycle.

LIMIT SWITCH IDENTIFICATION

| LIMIT SWITCH | ACTUATED BY | WHEN SWITCHES ARE IN NORMAL POSITION: |
|---|---|---|
| CB | Counterweight | Counterweights 75a and 75b raised |
| CS | Sensor slack | Chains taut |
| LV | Slider 104 on yoke 74a | 104 between LVL and LVI |
| LH | Trolley trip 105 | 105 between wall 34 and LHR |
| CL | Load sensor | Both chains 89a and 89b taut |

| LIMIT SWITCH | FUNCTION |
|---|---|
| CB1 & 2 | Chain break |
| CS1 & 2 | Raise bucket |
| LVD | Down limit |
| LVL | Dwell bypass |
| LVI | Intermediate limit up & down |
| LVU | Up limit |
| LHR | Reverse stop, forward medium speed |
| LHM | Slow speed start and reverse approach |
| LHD | Reverse medium speed, bucket lower forward |
| LHU | Bucket raise forward & slow speed, high speed reverse |
| LHI | Bucket lower reverse |
| LHS | Slow speed forward, medium speed reverse |
| LHF | Forward stop, reverse start |
| CL | Chain load limiter |

As best seen in FIG. 1, actuation of the LV limit switches is by a slider 104 which is fixed to the yoke 74a and embraces the upright member 28 of the framework 24. Actuation of the LH limit switches is by a trolley trip finger 105 which is seen in FIG. 1 to be nearly at the extreme lefthand end of the trolley. The limit switches LHR, LHM and LHD are illustrated in FIG. 1, and are carried upon individual mounting brackets 106 which are longitudinally adjustable upon a support bar 107. Also carried upon the brackets 106 are bell cranks 108 which are actually contacted by the trolley trip 105 and pivot 90° to actuate the respective switches LHR, LHM, and LHD. When the trolley 39a has moved from the position of FIG. 1 toward the discharge end of the tank all the bell cranks 108 are rotated 90° clockwise so that the bell crank arms which are vertical in FIG. 1 will be horizontal. Accordingly, when the trolley 39a makes its return run the trolley trip 105 may rotate the bell cranks 108 90° counterclockwise to return them to the positions illustrated in FIG. 1, and as a result the switches LHR, LHM and LHD are moved from the normal positions of FIG. 1 to actuated positions during a pickup run of the trolley 39a, and returned to their normal positions when the trolley returns to the position of FIG. 1.

The limit switches LHU, LHI, LHS and LHF are not illustrated in FIG. 1, but in fact they are also supported upon brackets like the brackets 106 which are longitudinally adjustable on a support bar like the bar 107, and each of the brackets carries a bell crank like the bell cranks 108.

The limit switches LVD, LVL, LVI and LVU are also not illustrated in FIG. 1, but in fact are mounted for vertical adjustment along an upright bar in positions where they may be contacted by the slider 104 as the counterweight pulley yoke 74a moves up and down.

The indications of limit switch function in the limit switch identification table show that several of the limit switches perform different functions in different phases of an operating cycle. Thus, LHR stops the trolley drive at the end of a return run and also initiates medium speed movement of the trolleys in a pickup direction to initiate a pickup run.

LHD reduces trolley travel from a high speed reverse to a medium speed, preparatory to stopping, on the return run of a cycle; and on the pickup run of a cycle it functions to cause the drag bucket 51 to be lowered from the "cycle start" position of FIG. 12 to the "ash collection" position of FIG. 13 where the drag bucket is at its initial pickup level.

Actuation of LHU on a pickup run causes the drag bucket to be raised from the position of FIG. 14 to the position of FIG. 15, and at the same time reduces the speed of the trolleys from a normal medium speed to a slow speed preparatory to stopping. On a return run actuation of LHU causes the bucket to go from a medium speed reverse travel to a high speed reverse travel.

The foregoing discussion of varying limit switch functions is believed to be sufficient to clarify the remaining statements of limit switch function in the limit switch identification table.

The functions of the LVD and LVU limit switches are believed to be entirely plain from the statement of function. This is not true of LVI or LVL. When the drag bucket is on a pickup run of a cycle, if operation of the pickup level control system V causes the drag bucket to approach the bottom of the water seal S, LVI places a limit upon the height to which the drag bucket may be raised so as to prevent striking the water seal S. On a return run LVI maintains the drag bucket as close as possible to the bottom of the water seal S so as to provide maximum clearance above the material in the tank 31.

With respect to the "dwell bypass" function of LVL, the apparatus is ordinarily adjusted so that when the trolley and bucket suspension means II reaches the cycle start position of FIG. 12 it will remain there for a predetermined dwell period in order to prevent unnecessary cycling of the apparatus, based upon a normal anticipated rate of collection of material in the tank. The dwell period could vary from a few minutes to several hours, depending upon the normal operating conditions of the equipment with which the apparatus is used.

If the drag bucket is raised far enough during a pickup run for the slider 104 to actuate LVL, which occurs only if there is enough material in the tank to resist forward travel of the drag bucket and actuate the pickup level control, the actuation of LVL during a pickup run causes a bypass of a time delay switch which normally causes the dwell of the drag bucket before starting a pickup run. In that event the trolley means starts a new pickup run as soon as it reaches the cycle start position at the end of a return run; and the apparatus continues to cycle without time delay as long as LVL is actuated on each pickup run.

As shown by the indication of function, limit switches CB1 and CB2 are solely safety devices which are operated only in the event a counterweight 75a or 75b drops due to the breaking of a drive chain 69a or 69b.

Figure 18:
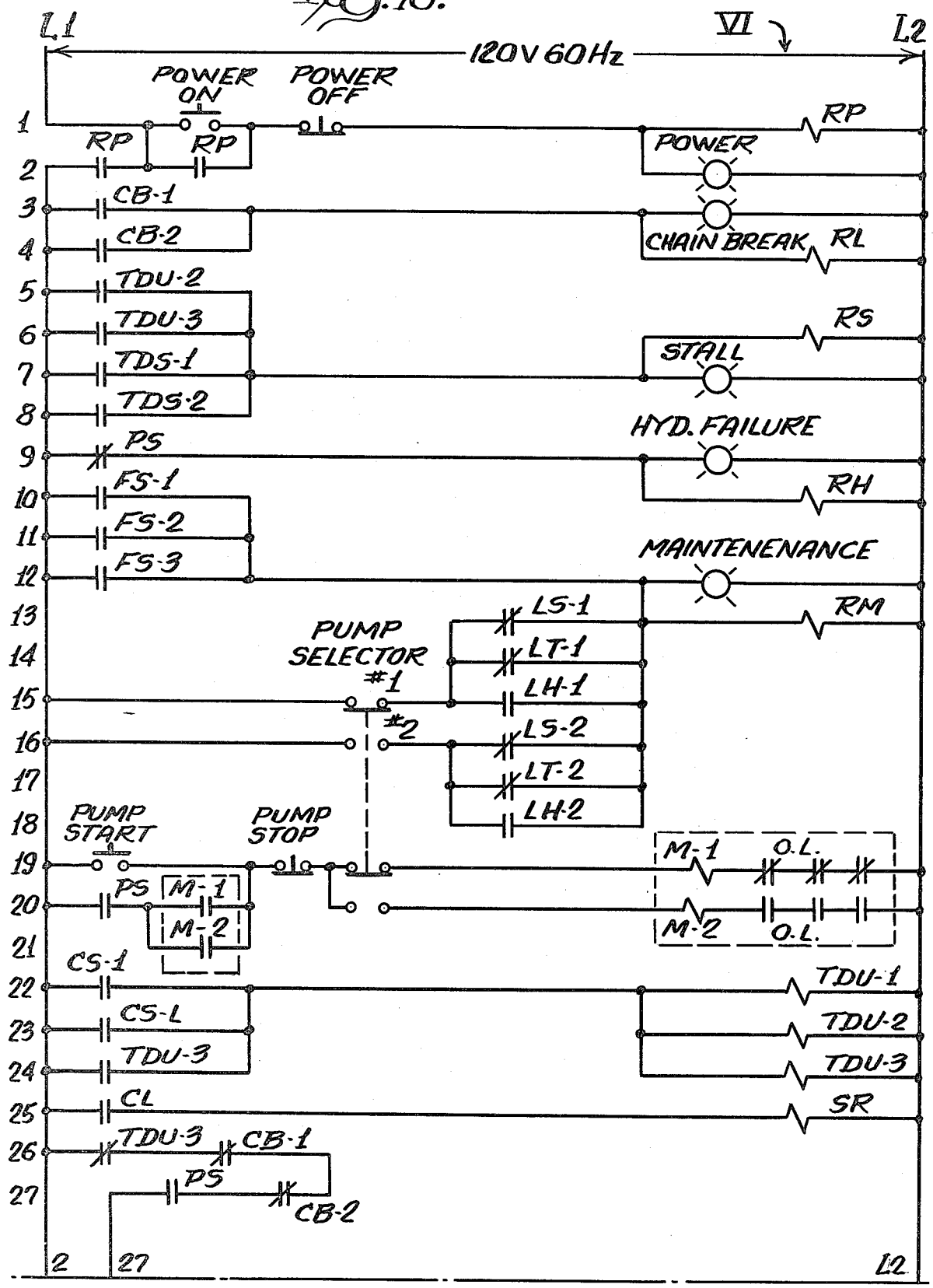
FIGS. 18 and 19 are an across-the-line wiring diagram of the electrical controls of the apparatus.
Figure 19:
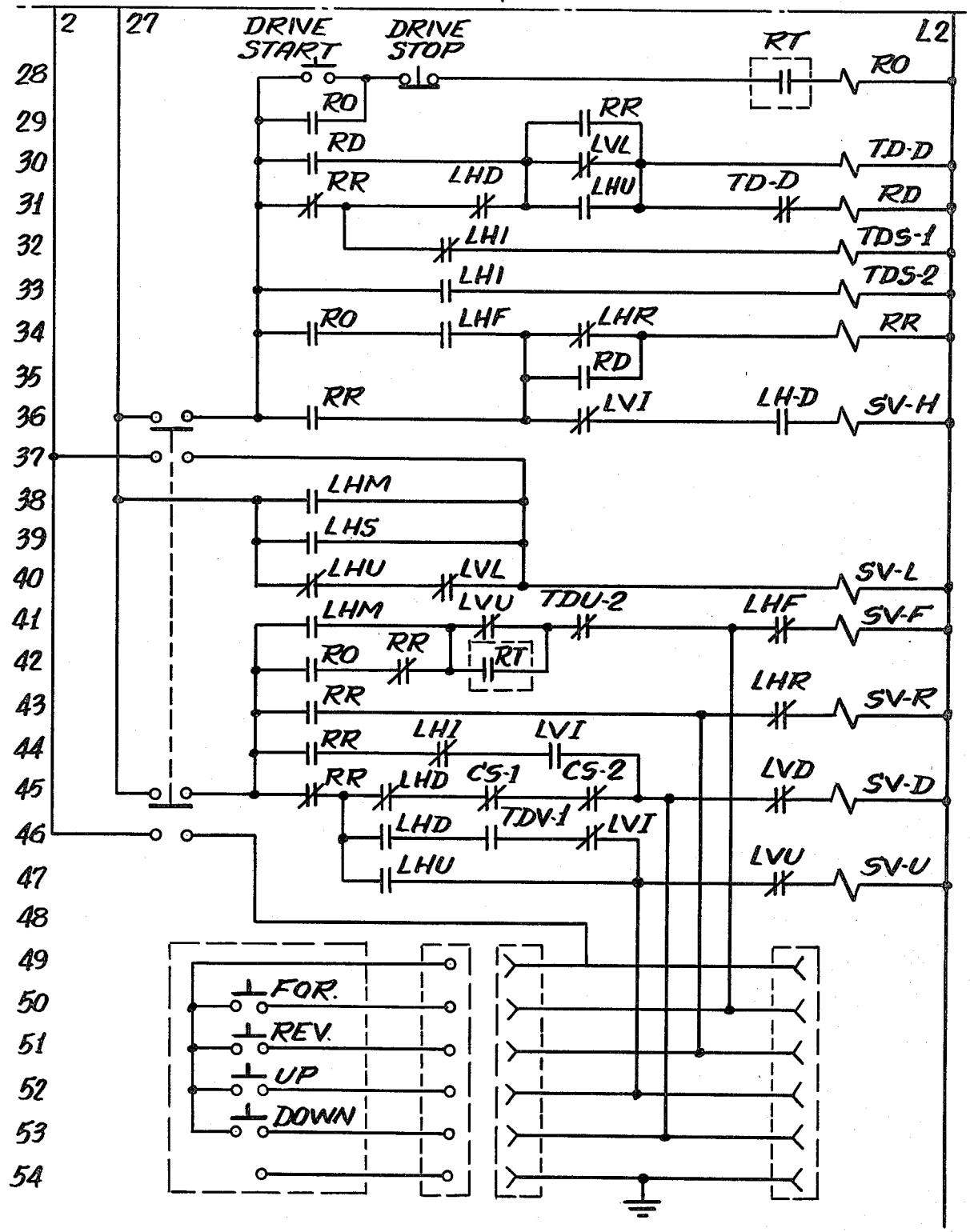

It is entirely possible for an apparatus constructed in accordance with the present invention to be cycled manually if the conditions of use of the apparatus are such as not to require extended automatic operation. However, when the apparatus is used with a large coal burning furnace, continuous automatic cycling is essential. The means for accomplishing this is shown in FIGS. 18 and 19, which show the automatic electrical control system. The electrical control system, of course, is useful primarily to control the hydraulic system VII which is illustrated in FIG. 20; but the latter, of course, could also be controlled, in large measure, by a relatively simple electrical circuit utilizing manual push button switches to control the cycling of the apparatus. Such controls are shown at lines 48 to 54 of FIG. 19, since manual operation may be needed temporarily.

Referring now primarily to FIGS. 18 to 20, and secondarily to FIGS. 12 to 17, a complete operating sequence of the apparatus is as follows.

The apparatus is started in three stages, consisting of a system start, a pump start, and a drive start.

The system is started by pressing a manual "Power On" button which energizes control relay RP which holds in and energizes the control circuit as far as PS-27.

PS-9 energizes a hydraulic failure light and an alarm relay RH. These remain energized only if, after the "Pump Start" step, hydraulic pressure fails to reach a proper level.

As a safety factor, the system is preferably provided with two hydraulic pumps, either one of which may be used to operate the hydraulic system; and related to each of the two pumps is a set of oil condition indicator switches. If oil level in the reservoir is too low, LS-1-13 or LS-2-16 will energize relay RM and the maintenance light. If the oil is too cold for proper operation, LT-1-14 or LT-2-17 will energize RM and the maintenance light; and if the oil supply is too hot for proper operation, LH-1-15 or LH-2-18 will energize RM and the maintenance light.

If RM and the maintenance light are not energized, the second step in apparatus start-up is to press the "Pump Start" button. With the pump selector set to pump No. 1, as shown, the motor starter M-1 energizes and holds in through contact M-1-20; and the motor M operates the pump P (FIG. 20). When hydraulic pressure reaches a proper level the pressure switch PS actuates, and this opens PS-9, deenergizing RH and the hydraulic failure light. The "Pump Start" button must be manually held in until the hydraulic failure light is extinguished.

It will be noted that relays M-1 and M-2 both contain the usual overload switches OL.

Closing pressure switch PS also closes PS-27, which energizes electric line 27.

After PS has closed, as evidenced by the hydraulic failure light being extinguished, the "Drive Start" button (FIG. 19) is pressed to energize relay RO which is held in through RO-29 and closes contacts RO-34 and RO-42. Thereupon the following operating sequences occur:

(1) A safety feature of the apparatus is that it is provided with stall alarm time delay relays TDS-1 and TDS-2, and upon energization of relay RO, RR-31 and LHI-32 set TDS-1 to begin its timing cycle.

(2) SV-F (FIG. 20) energizes through RO-42, RR-42, LVU-41, TDU-2 and LHF, moving drag bucket 51 forward and permitting LHR to reset to the positions shown on lines 34 and 43.

(3) SV-D (FIG. 20) energizes through RR-45, LHD-45, CS-1-45, CS-2-45 and LVD-45. This lowers the drag bucket from the ready position illustrated in FIG. 12 to the ash collection position illustrated in FIG. 13. At this time LVI resets to the positions shown on lines 36, 44 and 46.

(4) LVL-30 resets before LHD-31 is actuated; and this energizes RD through RR-31. RD holds in through RD-30 after LHD-31 actuates and closes RD-35. This also begins the timing of the dwell timer TD-D (line 30).

(5) Downward movement of the bucket must be stopped either when it reaches the initial pickup level, established by down limit LVD, or when it strikes material in the tank to cause a slack chain condition and actuate CS-1 or CS-2. Accordingly, actuation of LVD-45 or CS-1-45 or CS-2-45 deenergizes SV-D, stopping downward bucket movement.

(6) If, in the last preceding step, it was CS-1 or CS-2 which was actuated, rather than LVD, then TDU-1 is energized through CS-1-22 of CS-2-23. Actuation of LHD energizes SV-U through LHD-45, TDV-1-45, LVI-45 and LVU-47, so as to raise the bucket until LS-1 and/or LS-2 is reset.

(7) It will be observed that LHU-40 or LVL-40 are actuated, and this energizes SV-L (FIG. 20) to provide for low speed forward movement of the bucket.

(8) Regardless of whether a particular pickup run is started at the initial pickup level established by actuation of LVD, or at an intermediate level caused by actuation of CS-1 or CS-2, the bucket will be elevated incrementally if sufficient material buildup is encountered, as heretofore described; and that will take place through operation of the control components heretofore described.

(9) Toward the end of a pickup run, trolley actuator finger 105 actuates LHU, and LHU-47 energizes SV-U (FIG. 20) to operate the hydraulic cylinder unit 82 and raise the bucket. LHU-31 closes before LVL actuates, thus maintaining RD and SD-D energized. LHU-40 deenergizes SV-L, permitting the bucket to move forward at medium speed rather than slow speed. As the bucket continues upward, LVI actuates, and when the slider 104 contacts LVU, LVU-47 deenergizes SV-U to stop the upward movement of the bucket at the discharge level illustrated in broken lines in FIG. 3 and diagrammatically in FIG. 15.

(10) Trolley movement actuates LHI, which deenergizes TDS-1 and energizes TDS-2.

Any inordinate delay in a pickup run occurring while the bucket is in the pickup phase would have resulted in timing out of TDS-1 before it could be deenergized by actuation of LHI. TDS-2 accounts for any time delay which may occur after TDI is actuated on a pickup run and until it is again actuated on a return run, at which point TDS-2 is deactivated and TDS-1 is reactivated.

(11) The trolley actuates LHS, and LHS-39 energizes SV-L, returning the trolley to slow speed.

(12) LHF is positioned to be actuated by the trolley after the bucket dumps, and LHF-40 stops forward movement by deenergizing SV-F; and LHF-34 energizes RR through LHR and RD and holds in through RR-36.

(13) When RR is energized, RR-31 opens and RR-29 closes to maintain RD and SD-D after LSU resets.

(14) Further, with energization of RR, RR-42 opens and RR-43 closes, energizes SV-R (FIG. 20) to drive the motors in reverse and move the bucket rearwardly. LHF then resets.

(15) LHI resets, reenergizing TDS-1 and deenergizing TDS-2. At the same time, operation of LHI-44 energizes SV-D (FIG. 20) to charge the hydraulic cylinder unit 82 and lower the bucket. When the slider 104 reaches LVI, the latter resets, stopping the bucket lowering through LVI-44.

(16) LVI-36 energizes SV-H (FIG. 20). This provides for high speed rearward movement of the bucket until SV-H is deenergized when LHD is reset by trolley actuating finger 105, resetting LHD-36; and at the same time LHM energizes SV-L to return the trolley to low speed operation.

(17) Actuation of LHR by the trolley actuating finger 105 opens LHR-43 to stop the bucket by deenergizing SV-R which terminates motor operation.

(18) The bucket remains in the position of FIG. 12 until TD-D times out, deenergizing RD through TD-D-31 which deenergizes RR through RD-35. TD-D deenergizes through RD-30.

There are various special conditions which have been described in a general way heretofore.

It has previously been mentioned that if the drag bucket 51 is elevated far enough during a pickup run to actuate LVL, it deenergizes TD-D and RD to eliminate the dwell period before the next cycle. At the same time, LVL-40 opens, deenergizing SV-L to shift from low speed to medium speed.

If the drag bucket encounters an immovable object during a pickup run, then CS-1 and/or CS-2 will remain actuated until TDU-2 times out. When this occurs, TDU-2-41 opens to deenergize SV-F (FIG. 20) and stop forward movement of the trolleys until the upward movement of the drag bucket is sufficient to reset CS-1 and/or CS-2. During this operation the "Stall" light and relay RS are energized. If the object is so large that upward bucket movement is stopped by deenergizing SV-U through actuation of LVI-46, then TDU-3 times out together with TDU-1 and TDU-2. TDU-3 holds all three timers in through TDU-3-24, and the "Stall" light and RS remain energized.

If any failure prevents LHI from actuating and resetting at the correct intervals, then either TDS-1 or TDS-2 will time out through LHI-32 or LHI-33, as the case may be. RS and the "Stall" light will then be energized through TDS-1-7 or TDS-2-8, as the case may be.

If oil pressure falls below a preset level, then PS resets, opening all of the circuits beyond PS-27, stopping the pump through PS-20, and energizing RH and the hydraulic failure light.

As previously indicated, if a drive chain breaks, a counterweight can drop, actuating CB-1 or CB-2. CB-1-26 or CB-2-27 will open all circuits beyond CB-1-27; and CB-1-3 or CB-2-4 will energize RC and the chain break light.

The foregoing detailed description has been given for clearness of understanding only and no unnecessary limitations should be understood therefrom as modifications will be obvious to those skilled in the art.

I claim:

1. Drag bucket apparatus for removing pieces of solid material from the bottom of an elongated, rectangular, liquid filled receiving tank, said apparatus comprising, in combination:

trolley means adapted to move along the longitudinal upper margins of the tank between a start end and a dump end;

drive means for moving said trolley means between said ends in a pickup run and a return run;

a drag bucket in the tank;

supporting means suspending said drag bucket from the trolley means for movement between an initial pickup level near the bottom of the tank and a fully elevated discharge level above the liquid surface level;

drag bucket elevating means for moving the drag bucket between said initial pickup level and said discharge level;

drag bucket pickup level control means operatively associated with said supporting means and said elevating means, said level control means comprising, means for detecting when resistance to movement of the drag bucket through the material reaches a predetermined high point during a pickup run, and means operable when resistance reaches said predetermined high point to operate said elevating means only until said resistance drops below said high point, whereby the drag bucket is elevated incrementally during a pickup run to keep said resistance below said high point;

means for operating said elevating means to fully elevate the drag bucket to the discharge level as it nears the dump end;

load release means adjacent the dump end which cooperates with the fully elevated drag bucket to release the entire contents therefrom;

a material support out of the liquid onto which the drag bucket contents drops;

means for starting the trolley driving means and lowering the drag bucket to the initial pickup level to begin a pickup run;

means for stopping the trolley driving means when the drag bucket dumps;

means operable to cause the elevating means to lower the drag bucket to a return level;

and means for operating the trolley driving means to return the trolley means to the start end.

2. The apparatus of claim 1 in which the supporting means is a pair of linkages which are pivotally mounted on and extend downwardly and rearwardly from the trolley means and are pivotally connected to the two ends of the drag bucket, said linkages being adapted to retain the angular disposition of the drag bucket as they swing about the trolley means, and in which the elevating means includes a chain secured to each linkage for swinging the linkages upwardly from the initial pickup level.

3. The apparatus of claim 2 in which the load release means comprises fixed trip bars supported on the tank, and trip arms on the linkages which strike said bars to tilt the drag bucket forwardly.

4. The apparatus of claim 2 in which the chains of the elevating means are also a part of the drive means and have bights in which counterweight sprockets are suspended, counterweights on which said sprockets are mounted may move downwardly in response to upward movement of the supporting linkages which occurs when resistance to movement of the drag bucket reaches said predetermined high point and the drag bucket swings upwardly on the linkages to attain a level at which said resistance is below said high point, and in which the drag bucket pickup level control means comprises means for sensing said downward movement of the counterweights, and means responsive to the sensing of a downward movement to actuate the drag bucket elevating means to hold the drag bucket at said attained level.

5. The apparatus of claim 4 in which the drive means includes a pair of interconnected drive sprockets, a motor operatively connected to each of said sprockets, a pair of chains trained around said drive sprockets and connected at one end to the front of the trolley means, each of said chains being trained around a system of sprockets which form said bights in which the counterweight sprockets are suspended, in which an upright hydraulic cylinder unit having a piston rod and a yoke secured to the piston rod is a part of the drag bucket elevating means, and in which the pickup level control means includes a slack sensor chain connected to each counterweight and adapted to become slack upon downward movement of the counterweight, a pair of yoke sprockets over each of which one of the slack sensor chains is trained, a dead-end hitch below the yoke to which the slack sensor chains are anchored, a pair of pivoted sensor arms each of which carries a sprocket that lies in a horizontal run of a sensor chain between the counterweight and the yoke sprocket, and hydraulic cylinder control means actuated by downward movement of a sensor arm responsive to slack in a slack sensor chain to actuate the hydraulic cylinder and eliminate said slack by movement of the yoke.

6. The apparatus of claim 5 in which the trolley means consists of two independent trolleys connected only by the supporting linkages and the drag bucket, in which there is a spring-centered, pivoted balance plate which carries the dead-end hitches on opposite sides of the plate pivot, in which a cam arm on said balance plate maintains a load control switch in an inactive position, and in which means is provided for reducing the lifting pressure applied to the hydraulic cylinder in response to actuation of the load control switch, whereby pivoting of the balance plate due to continuing slack in one slack sensor chain reduces the lifting force applied to the other chain.

7. The apparatus of claim 1 in which the drive means includes motor means, speed control means for operating said motor means selectively at a low speed or at an intermediate speed during a pickup run, and means for operating said motor means at a high speed during a return run.

8. The apparatus of claim 7 in which the speed control means includes means for normally operating the motor means at a low speed during a pickup run, and means responsive to the presence of a predetermined high level of material in the tank for automatically shifting to intermediate speed.

9. The apparatus of claim 1 which includes a control system to automatically operate the apparatus through an indeterminate number of cycles each of which comprises a trolley pickup run, a drag bucket fully elevating step, a load release step, a drag bucket lowering step, and a trolley return run.

10. The apparatus of claim 9 in which the drive means includes motor means, speed control means for operating said motor means selectively at a low speed or at an intermediate speed during a pickup run, and means for operating said motor means at a high speed during a return run, and in which the control system automatically selects motor operating speed during each pickup run depending upon conditions encountered during said run, and automatically selects said high speed for a return run.

11. The apparatus of claim 9 in which the control system includes an adjustable time delay for delaying the start of a pickup run until a predetermined time has elapsed after the end of a return run.

12. The apparatus of claim 11 which includes means for automatically eliminating said delay of the start of a pickup run in response to actuation of the drag bucket pickup level control means during the last preceding pickup run.

13. The apparatus of claim 12 in which the means for automatically eliminating the delay of the start of a pickup run is actuated only if the drag bucket level is raised by the pickup level control so that the drag bucket level is above a predetermined level.

14. The apparatus of claim 11 which includes means for manually eliminating said delay of the start of a pickup run.

15. The apparatus of claim 1 in which the material support is above the liquid level.

16. The apparatus of claim 15 in which the material support is outside the dump end of the tank and is inclined so that material slides off said support and away from the tank end.

17. The apparatus of claim 1 in which the tank is a quenching tank beneath a furnace which has a water seal that extends below the surface of liquid in the tank and is spaced inwardly from all four tank walls, and the trolley means and the drag bucket supporting means are entirely outside said seal with only the drag bucket beneath the seal.

18. The apparatus of claim 17 which includes means for restricting actuation of the pickup level control means to avoid interference of the drag bucket with the seal.

19. Drag bucket apparatus for separating pieces of solid material from liquid in a receiving tank, said apparatus comprising, in combination:
   trolley means adapted to move along the longitudinal upper margins of the tank between a start end and a dump end;
   drive means for moving said trolley means between said ends in a pickup run and a return run;
   a drag bucket in the tank;
   supporting means suspending said drag bucket from the trolley means for movement between an initial pickup level near the bottom of the tank and a fully elevated discharge level;
   drag bucket elevating means for moving the drag bucket between said initial pickup level and said discharge level;
   drag bucket pickup level control means operatively associated with said supporting means and said elevating means, said level control means comprising,
   means for detecting when resistance to movement of the drag bucket through the material reaches a predetermined high point during a pickup run,
   and means operable when resistance reaches said predetermined high point to operate said elevating means only until said resistance drops below said high point, whereby the drag bucket is elevated incrementally during a pickup run to keep said resistance below said high point;
   control means for the trolley driving means and the elevating means to provide an operating cycle in which the drag bucket moves through a pickup run starting at the initial pickup level and ending at the discharge level, and a return run, with the pickup level control means operative throughout the pickup run;
   and a load release means for releasing the contents of the fully elevated drag bucket at the dump end.

20. The apparatus of claim 19 in which the drive means includes motor means, speed control means for operating said motor means selectively at a low speed or at an intermediate speed during a pickup run, and means for operating said motor means at a high speed during a return run.

21. The apparatus of claim 20 in which the speed control means includes means for normally operating the motor means at a low speed during a pickup run, and means responsive to the presence of a predetermined high level of material in the tank for automatically shifting to intermediate speed.

22. The apparatus of claim 19 in which the control means comprises a control system to automatically operate the apparatus through an indeterminate number of cycles each of which comprises a trolley pickup run, a drag bucket fully elevating step, a load release step, a drag bucket lowering step, and a trolley return run.

23. The apparatus of claim 22 in which the drive means includes motor means, speed control means for operating said motor means selectively at a low speed or at an intermediate speed during a pickup run, and means for operating said motor means at a high speed during a return run, and in which the control system automatically selects motor operating speed during each pickup run depending upon conditions encountered during said run, and automatically selects said high speed for a return run.

24. The apparatus of claim 22 in which the control system includes an adjustable time delay for delaying the start of a pickup run until a predetermined time has elapsed after the end of a return run.

25. The apparatus of claim 24 which includes means for automatically eliminating said delay of the start of a pickup run in response to actuation of the drag bucket pickup level control means during the last preceding pickup run.

26. The apparatus of claim 25 in which the means for automatically eliminating the delay of the start of a pickup run is actuated only if the drag bucket level is raised by the pickup level control so that the drag bucket level is above a predetermined level.

27. The apparatus of claim 24 which includes means for manually eliminating said delay of the start of a pickup run.

* * * * *